June 9, 1936.  A. NAGEL  2,043,903
CAMERA LATCH
Filed Oct. 19, 1934
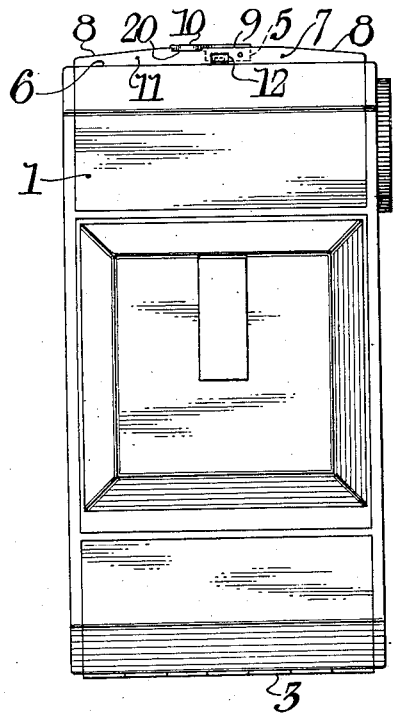
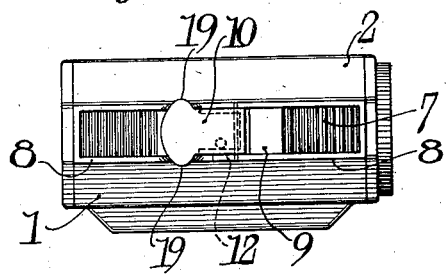
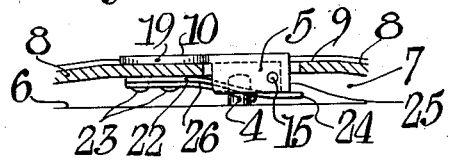
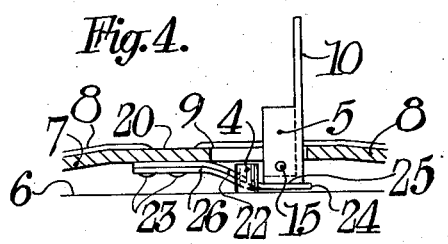
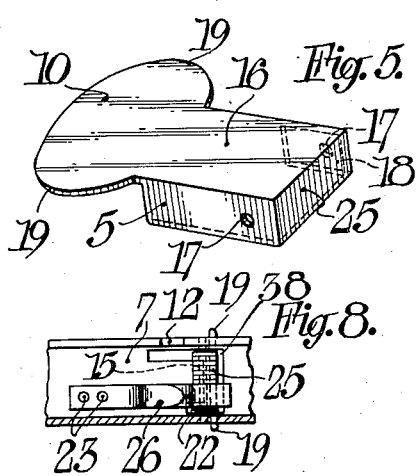
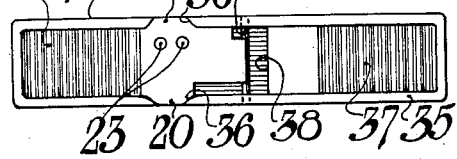
Inventor:
August Nagel, Patented June 9, 1936

2,043,903

UNITED STATES PATENT OFFICE 2,043,903

CAMERA LATCH

August Nagel, Stuttgart, Germany, assignor to Eastman Kodak Company, Rochester, N. Y., a corporation of New York Application October 19, 1934, Serial No. 749,082
In Germany December 6, 1933

1 Claim. (Cl. 292—204)

This invention relates to photography and more particularly to a latch for photographic cameras.

One object of my invention is to provide a camera latch which is simple in construction and which can be readily operated. Another object of my invention is to provide a camera latch which is positive in operation and which will move automatically as the two parts of the camera to be latched together are brought together so that the parts will snap together. Another object of my invention is to provide a camera latch which is neat in appearance and which does not project out from the camera body, and other objects will appear from the following specification, the novel features being particularly pointed out in the claim at the end thereof.

Coming now to the drawing wherein like reference characters denote like parts throughout:

Fig. 1 is a front plan view of a camera provided with a latch constructed in accordance with and embodying a preferred form of my invention.

Fig. 2 is a top plan view of the camera and latch shown in Fig. 1.

Fig. 3 is an enlarged fragmentary sectional view through the latch in a closed or operative position.

Fig. 4 is a similar view of the latch in an inoperative open position.

Fig. 5 is a perspective view of a camera latching element removed from the camera.

Fig. 6 is a section through a portion of the camera and latch with the parts in a locking position.

Fig. 7 is a plan view of the plate on which one of the latched elements is mounted, the latch element being removed.

Fig. 8 is a plan view of a part of the plate shown in Fig. 7 from the lower side, showing the spring which controls the position of the camera latch.

It is customary in camera construction to provide a camera back which is movably mounted with respect to a camera body, the back either being removable from the camera body or having a hinge connection therewith.

As a preferred embodiment of my invention, I have illustrated a camera body 1 as having a back 2 which is hingedly attached at 3 to the camera body and which is provided with interengaging latch elements 4 and 5 by which the camera back may be attached to the camera body.

I prefer to form the latch so that it will be as inconspicuous as possible. Across one end 6 of the camera I provide a shallow housing 7 which encloses the latch mechanism. This housing preferably extends across the entire top of the camera and may be provided with tapering walls 8 leading up to a central area 9 on which the handle 10 of the latch element 5 is mounted. One of the side walls 11 of the housing 7 is provided with a small opening 12 of a size and shape to admit the passage therethrough of the pin 4 which forms one of the latching elements. As shown in Fig. 6, this pin 4 is provided with a beveled top 14 which can engage and cam the latching element 5 about the pintle 15 so that the latching element 5 will spring over the pin 4 and will spring down again into the position shown in Fig. 6 for holding the parts together.

As shown in Fig. 5, the latching element 5 is a flange formed downwardly from a plate 16 which is pivoted by means of a pintle pin 15 which passes through the apertures 17 in the downwardly extending flanges 5 and 18 and which also passes through the side walls 11 of the housing 7. The latching element handle 10 is flattened out and has rounded edges 19 which, as shown in Fig. 2, are adapted to project slightly beyond the side walls 8 of the housing 7. This renders the latch handle accessible so that it can be easily operated. To prevent the latch from being accidentally operated, I prefer to provide a recess 20 in the top wall of the housing 7 so that, as indicated in Fig. 1, the latch handle fits down substantially flush with the top of the housing.

It should be noted that with a latch element 5 as described above, since the depth of the element 5 is comparatively slight and since the length of the handle 10 is much greater than the depth of the flange, an operator has considerable mechanical advantage by means of this lever so that the latch can be very easily operated even though a relatively stiff spring is employed to hold the latching elements in position.

The spring for holding the latching elements in either an open or a closed position, as best shown in Figs. 3, 4, and 8, consists of a spring member 22 which is riveted at 23 to the bottom of the housing 7, preferably to that part of the housing which has been recessed at 20 to receive the handle 10. The end 24 of this spring engages the flat flange 25 of the latching element, and since this flange is positioned on the end of the latching element, its contact with the end of the spring will either tend to press the latch downwardly with the handle 10 resting in the seat 20, as shown in Fig. 3, or to press the latch upwardly and hold it in the inoperative position shown in Fig. 4.

If desired, the spring may be provided with a reinforcing leaf 26, the sole purpose of this spring being to obtain additional spring pressure.

The housing may be permanently attached to one part of the camera in any desired manner, but, as indicated in Fig. 6, one side wall 11 may be formed downwardly at 31 to fit into a recess 32, in which position it may be attached by rivets 33. When a leather covering 34 is placed over the camera walls, this attaching flange is effectively concealed.

I also prefer to form the housing 7 with a rounded bead or rib 35 extending around the upper edge of the housing, except for portions 36 which have been cut away to form a seat 20 for the handle 10. This rib 35 may be nickeled or polished to make a neat looking latch, and the center portion 37 of the housing top may have a substantially L-shaped slot 38 (best shown in Fig. 8) cut through the metal, permitting the latching element 5 and its handle 10 and the trunnions 5 and 18 to extend through the top wall of the housing.

However, when the handle has been assembled, as indicated in Fig. 2, these slots are not noticeable and a neat and compact latch is formed which presents a substantially smooth contour on the outside of the camera and yet which is provided with slightly projecting flanges 19 to facilitate the operation of the latch.

The operation of this latch is extremely simple. When the latching elements are in an operative position, as shown in Fig. 3, the flange 5 is engaged behind the latching pin 4 and the movable camera parts are held firmly latched together. To open the camera, the handle 10 is merely swung to the position shown in Fig. 4, in which it is retained by the spring 22 to free the latching pin 4. The camera back can then be swung away from the camera body and the pin 4 may pass from the housing through the small opening 12.

If the latch is moved to the position shown in Fig. 3—that is, its operative position—before the camera back is brought to a closed position with respect to the camera body, the cam surface 14 of the pin will cause the locking element 5 to ride up the cam, causing the latch to spring partially open and then to close as the pin passes through the opening 12 into an operative position. Thus the latch elements cannot be damaged by bringing the camera back up against the body with the latch in any desired position.

Having thus described my invention, what I claim as new and desire to secure by Letters Patent of the United States is:

In a latch adapted for use with cameras having two relatively movable parts with a pin on one of said parts, the combination of a housing on said other part, said housing including top, side, and end walls, said top wall having a surrounding flange and an angular slot, said surrounding flange being recessed to form a handle seat, an opening in the side wall to receive the pin, a latch member inside of the housing comprising a flange adapted to engage and hold said pin inside of the housing, a handle for said latch member adapted to lie flat in the recessed seat and to project a slight distance to each side of the housing, said latch member being hingedly mounted on the housing and being adapted to be moved transversely thereof to and from an operative pin engaging position, and a spring tending to hold said latch member in either position.

AUGUST NAGEL.